United States Patent
Belanger

[15] 3,685,217
[45] Aug. 22, 1972

[54] ROTARY FINISHING WHEEL OR TOOL

[72] Inventor: James A. Belanger, Livonia, Mich.

[73] Assignee: Belanger, Inc., Northville, Mich.

[22] Filed: Dec. 17, 1969

[21] Appl. No.: 885,734

[52] U.S. Cl. .................................. 51/337, 15/230.14
[51] Int. Cl. ............................................. B24d 13/04
[58] Field of Search ........ 51/334, 335, 336, 337, 356; 15/183, 230.14

[56] References Cited

UNITED STATES PATENTS

| | | | |
|---|---|---|---|
| 2,430,099 | 11/1947 | Bradley | 51/335 |
| 2,474,063 | 6/1949 | Newton | 51/335 |
| 2,522,920 | 9/1950 | Baltes | 51/335 |
| 2,625,774 | 1/1953 | Tenny | 51/335 |
| 3,058,269 | 10/1962 | Block | 51/337 |
| 3,533,198 | 10/1970 | Burns | 51/337 |
| 2,015,646 | 9/1935 | Hillix | 15/230.14 |
| 2,581,411 | 1/1952 | Hendrickson | 15/230.14 |
| 2,871,632 | 2/1959 | Cosmos | 51/337 |

*Primary Examiner*—Lester M. Swingle
*Attorney*—Whittemore, Hulbert & Belknap

[57] ABSTRACT

Annular and co-axial plates are optionally spaced axially from and restrained in rigid assembly with one another either by a cylindrical hub-like structure, by circumferentially spaced rods, or a combination of such means, to afford a composite wheel body structure. The annular members mount multiple bearing pins in a circumferential array equidistantly outwardly of said spacer means; and a replaceable finishing flap unit is pivoted on each pin on an axis paralleing that of the wheel. In wheel bodies embodying cylindrical spacer-retainer means, such means may serve as a wheel driver hub; or it may be supplemented by annular end adapter discs at which the wheel hub receives its drive.

17 Claims, 14 Drawing Figures

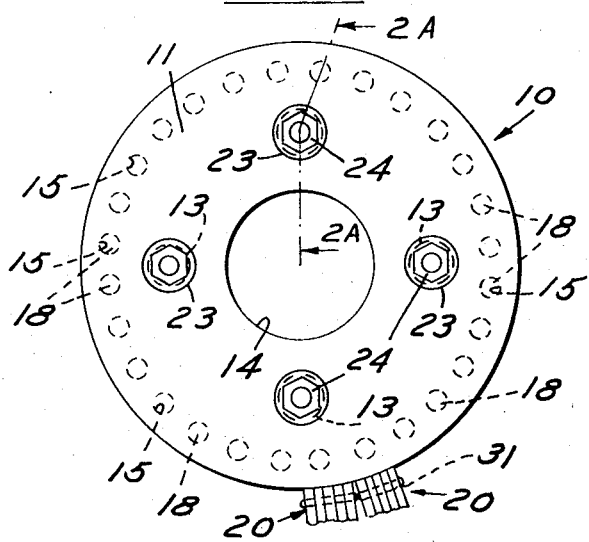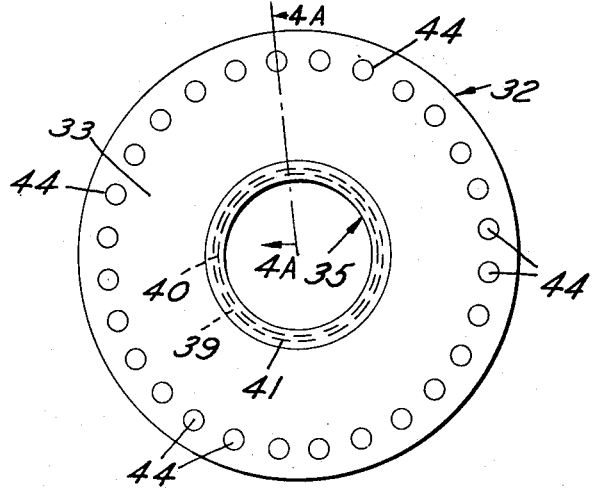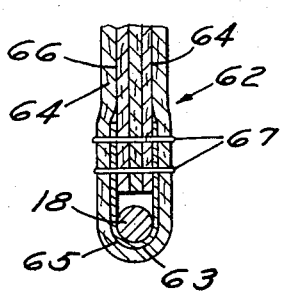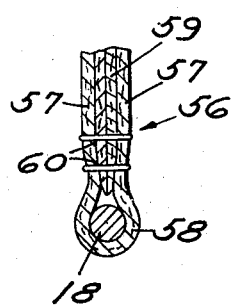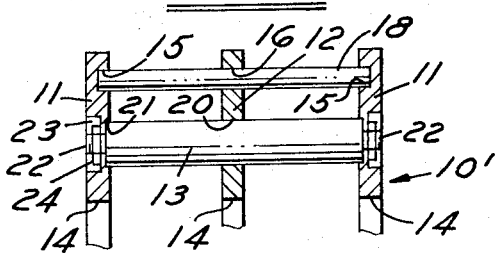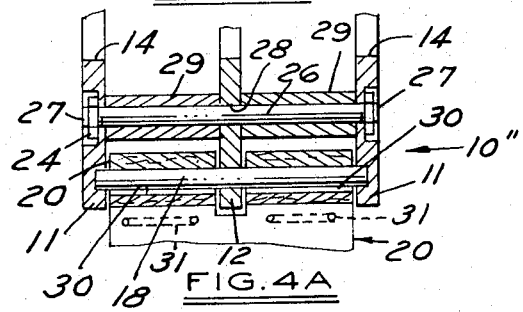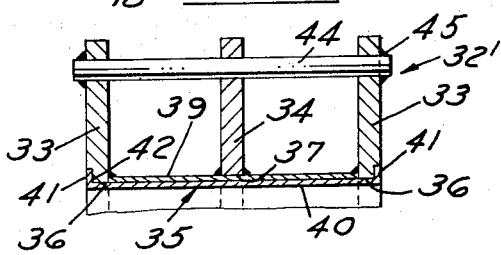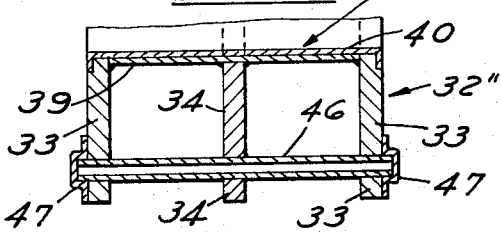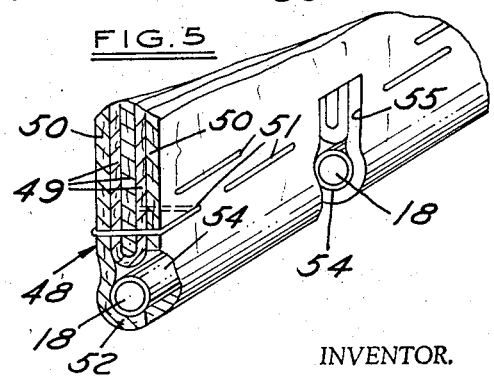
INVENTOR.
JAMES A. BELANGER
BY
Whittemore, Hulbert
& Belknap
ATTORNEYS

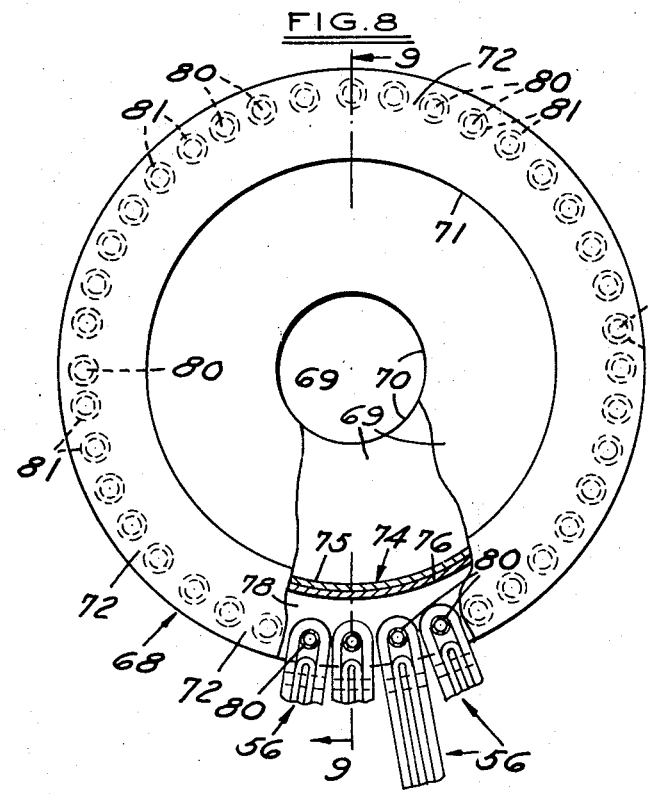
FIG.8
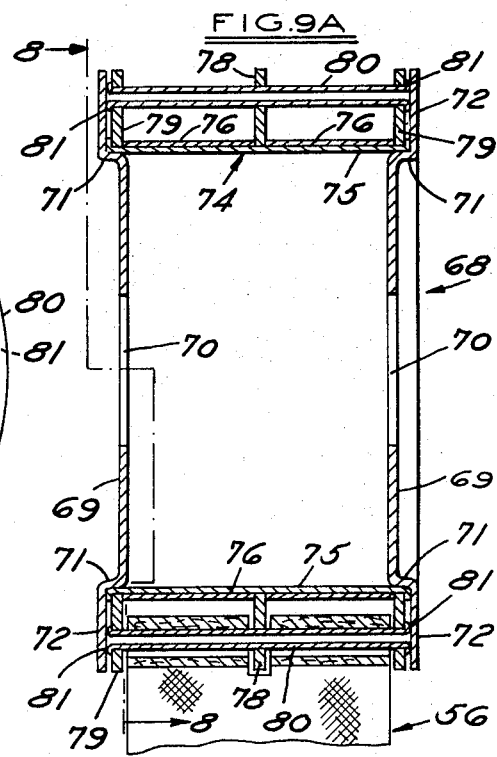
FIG.9A
FIG.9B
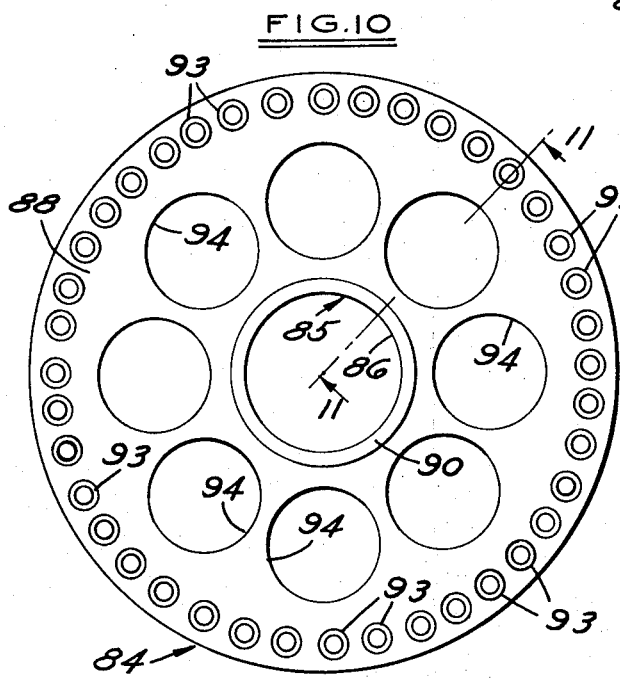
FIG.10
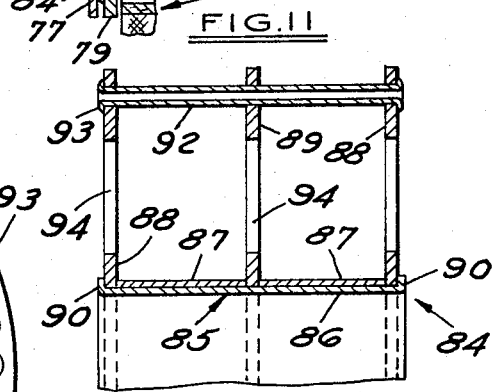
FIG.11
INVENTOR
JAMES A. BELANGER
BY Whittemore, Hulbert & Belknap
ATTORNEYS

ROTARY FINISHING WHEEL OR TOOL

CROSS-REFERENCE TO RELATED APPLICATIONS

My co-pending applications, Ser. No. 822,776, filed Feb. 24, 1969, now U.S. Pat. No. 3,535,833, dated Oct. 27, 1970 (a division of Ser. No. 485,497, filed Sept. 7, 1965 — now U.S. Pat. No. 3,455,068 of July 15, 1969), Ser. No. 856,773, filed Sept. 10, 1969, now U.S. Pat. No. 3,621,622, dated Nov. 23, 1971, and Ser. No. 857,885, filed Sept. 15, 1969, now U.S. Pat. No. 3,626,646, dated Dec. 14, 1971 relate to rotary finishing wheels or tools employing pivotally mounted finishing flaps of the general type contemplated by the present invention, although the latter contemplates certain improvements in regard to the flap structure. Otherwise, the invention differs primarily from the disclosures of my applications and mentioned patent in reference to features of the wheel body construction by which the flaps are pivotally mounted in an annular series to afford a circumferentially continuous finishing surface, with a well balanced action of the latter.

BACKGROUND OF THE INVENTION — FIELD

The improved rotary finishing tool of the invention finds wide application in the same fields as those of my applications identified above, i.e., in grinding, buffing and like finishing or polishing, brushing and like operations on metal or non-metallic hard surfaced workpieces, commonly performed at high rotary and linear surface speed.

SUMMARY OF THE INVENTION

The invention affords a number of embodiments of rotary finishing tool, all characterized by low production cost and lightness in weight coupled with ruggedness and strength suiting the same to the demanding operating conditions to which such equipment is normally subjected. More specifically, in each of the various modifications or adaptations of a tool herein shown and described, and in other variants thereof which will suggest themselves to those skilled in the art, a composite wheel body assembly is constituted by plural, substantially similar and relatively thin, axially spaced annular discs or plates, which are rigidly held together by simple spacer means of one sort or another, illustrated herein as being of a rod-like or cylindrical hub-like matter. Thus, as indicated above, the material and assembly costs of production of finishing wheels pursuant to any of the embodiments of the invention are very low, indeed. An always desirable lightness in weight may be further enhanced in some cases by optionally forming annular disc components to provide weight-reducing apertures arranged in an annular series about the disc axis.

In versions of the improved wheel in which the annular bearing pin mounting plates are spaced axially from one another by intervening transverse rod means paralleling the wheel axis, this may be done in various ways, for example, by using an annular series of solid section cylindrical rods fixedly secured to the end-most component plates, as by bolted ends, or by using tubular spacers intervening between the plates and sleeved on transversely elongated bolt or stud elements, also in releasable assembly with the plates. These alternatives afford an ability to readily dismantle and re-assemble the wheel body, as to replace worn finishing flap units; however, the connections may be more permanent, as by riveting, welding or the like, if such is desired.

In the case of wheels in which the annular bearing pin mounting plates are mounted to cylindrical and axial, hub-like spacing and restraining means, such means is of a special, plural sleeve character and more or less permanently holds the plates from axial movement relative to one another; and this restraining action may be supplemented by a comparable action at the pins upon which the polishing or finishing flaps have a pivotal bearing. However, as in the embodiments referred to in the preceding paragraph, the cylindrical spacer provisions may also be of a more readily removable and replaceable nature.

BRIEF DESCRIPTION OF THE DRAWING

FIG. 1 is an end elevational view of a rotary finishing wheel featuring a plural space rod embodiment of the invention;

FIG. 2A is a fragmentary view in radial section through the unit of FIG. 1, as on line 2A—2A of FIG. 1, showing one adaptation of the latter;

FIG. 2B is a fragmentary view in section similar to FIG. 2A, but illustrating a slightly different adaptation of the same embodiment;

FIG. 3 is an end elevational view of a further embodiment incorporating cylindrical hub-like plate spacing and restraining means, finishing flap units being omitted in this figure for simplicity;

FIG. 4A is a fragmentary view in section on broken line 4A—4A of FIG. 3, illustrating one adaptation of the cylindrical spacer-restrainer means of that figure;

FIG. 4B is a fragmentary view in section similar to FIG. 4A, showing a slightly modified adaption of the latter's pin arrangement;

FIG. 5 is a fragmentary perspective view, partially broken away, illustrating one form of pivotal finishing flap unit adapted for use on the wheel body constructions if FIGS. 1 and 3, and other constructions also shown herein;

FIG. 6 is a fragmentary view in end elevation of a modified and simpler type flap unit;

FIG. 7 is a fragmentary end view similar to FIG. 6 of still another flap embodiment;

FIG. 8 is an end elevational view, partially broken away and in transverse vertical section on a line corresponding to line 8—8 of FIG. 9A, illustrating a further basic wheel embodiment in which the component annular plates are spaced and restrained axially by cylindrical means;

FIG. 9A is a fragmentary view in transverse diametral section on a line corresponding to line 9—9 of FIG. 8;

FIG. 9B is a fragmentary view in section similar to FIG. 9A, showing a slightly modified adaptation of the latter's structure;

FIG. 10 is an end elevational view of a wheel body unit incorporating another embodiment of a cylindrical plate mounting structure, finishing flaps being omitted for simplicity; and FIG. 11 is a fragmentary view in transverse radial section on line 11—11 of FIG. 10.

DESCRIPTION OF PREFERRED EMBODIMENT

One embodiment 10 of the finishing wheel of the invention, as illustrated in FIGS. 1, 2A and 2B, is of a spacer rod type, in which a pair of annular circular end discs or plates 11 and a similar plate 12 disposed centrally between them are held in coaxial axially spaced relation to one another by means of a circumferential series of elongated cylindrical rods 13. The latter are of solid cross section and are located at the same radial distance outwardly of the rotative axis of the wheel unit 10, which is the axis of center holes 14 through the plates 11, 12 at which they are secured to a suitably powered rotary drive shaft or spindle (not shown). In a typical wheel there may be four such rods equally spaced circumferentially from one another in a circumferential zone intermediate the inner and outer diameters of the annular plates 11, 12.

Pursuant to the invention, and in common with similar plates of other wheel embodiments to be described, the plates may be fabricated of relatively thin but rigid stock, for example, 11 gauge medium carbon hot or cold rolled steel, or, as possibly determined by the nature of the work to be done, of a non-metallic but relatively rigid sheeting from which they may be stamped, such as nylon. Similarly, the several rods 13 may be of a cylindrical metallic or non-metallic material of adequate rigidity and capable of ready machining in respects to appear.

In a circumferential zone just inwardly of their outer periphery each of the annular end plates 11 is provided on its inner side surface with a circumferential series of rather shallow depth recesses 15, and the intermediate plate 12 has annular series of correspondingly spaced through holes 16, the respective recesses 15 and holes 16 being in axial register with one another.

They thus may receive elongated pad bearing or pivoting pins 18; and in a typical wheel unit 10 there will be 30 such pins equally spaced 12° from one another, each serving to pivotally mount a finishing flap unit, generally designated 20. This may be of the type illustrated and described in my copending applications identified above, or in the alternative as disclosed in FIGS. 5, 6 and 7 hereof. That is, they are multiple layer fill units of leather, cloth, sisal, coated abrasive cloth or other fabric material, which fabrics may be, if desired, be treated in various ways known to the art to increase the hardness or otherwise regulate the action thereof.

By preference, the flap bearing or pivot pins 18 have a snug but not tight fit in the plate recesses 15 and through holes 16 to enable them to be removed from the plates 11, 12 and replaced thereon in substituting a new flap series from a worn or used one. Pins 18 may be of any suitable metal or in the form of extruded rod elements of a suitably stiff plastic stock. They are of considerably less diameter than the spacer rods but are well braced against transverse bend at the mounts to the annular plates 11, 12.

Considering FIG. 2A in conjunction with FIG. 1, the plate spacing rods 13 shown in the former, are of solid cylindrical cross-section, and they preferably have a press or force fit centrally of their length in a through hole 20 of the intermediate annular plate 12, so as to enable an initial and permanent assembly of all spacer rods 13 to that plate, with the two other end plates 11 being removable from the rod ends. In the embodiment of the wheel specially designated 10', as illustrated in FIG. 2A, the inner sides of the annular plates 11 are provided with shallow circular recesses 21 seating opposite full diameter end portions of the rods 13, thus locking the three annular plates 11 and 12 against rotation relative to one another about their common axis. Each rod has reduced diameter threaded end extremities 22 which extend through holes at the axial bottom of the circular seats 20 into circular recesses 23 of greater depth formed in the outer sides of each of the two end plates 11. Such recesses 23 accommodate nuts 24 threaded onto the reduced rod extremities 22, thus to rigidly but releasably hold all parts of the rotary tool or wheel assembly 10' rigidly together. The end shoulders of the rods 13 adjoining the threaded extremities fit into the shallow circular recesses 21 of the side plate to give a very rigid and displacement resisting assembly, indeed. If desired and practical, the threaded nut securement of the rods may be replaced by a more permanent connection, riveted, welded or the like, but of course accompanied by increased difficulty of dismantling, if desired.

The embodiment FIG. 2B, generally designated 10", differs but slightly from the form 10' of FIG. 2A, so that corresponding reference numerals are employed to designate corresponding parts or relationships, and further description is to this extent dispensed with. In this instance, the several solid-section spacing rods 13 of FIG. 2A are each replaced by an elongated bolt or stud element 26, threaded at the opposite ends 27 thereof to receive the nuts 24. The element 26 preferably has a press fit in a through opening 28 of the intermediate annular plate 12, for the same objective described above in connection with the spacer rods 13. Stud element 26 has a pair of spacer sleeves 29 snugly telescoped thereon on each side of the middle plate 12, these sleeves being tightly compressed between the end plates 11 and the intermediate plate when the nuts 24 are taken up. As before, the threaded nut connection may be replaced by a more permanent one, such as rivet means, but with an obvious loss of ease of dismantling and re-assembling, as mentioned above. The spacing sleeves 29 have flush end-to-end abutting engagement with the flat inner surfaces of plate members 11 and 12.

FIG. 2B shows a finishing flap unit 20 as having a loose pivotal mount on a bearing pin 18, on each axial side of an axial notch spanning the intermediate plate 12, as at a loop or bight 30 on the inner radial end of the flap 20. The plies or fills of the latter are tightly fastened together radially inwardly of bight 30 by conventional staple or belt lacer means 31.

The modified embodiment of the finishing wheel which is generally designated 32 and is shown in FIGS. 3, 4A and 4B, differs basically from what is shown in FIGS. 1, 2A and 2B in that the annular outer end plates 33 and the similar, centrally intermediate smaller plate 34 are held in their contemplated equally spaced relation to one another by means essentially comprising a composite hub structure 35 coaxially received through circular aligned axial openings 36 in plates 33 and a corresponding opening 37 in the intermediate plate 34. The hub structure 35 will, like the axial center bores 12 of the embodiment of FIG. 1 be fixedly secured to an appropriate driving shaft or spindle (not shown). It is contemplated that the plate spacing and bracing function of the hub structure 35 may, if desired, be supplemented by the action of the finishing flap pivoting or bearing pins of the unit 32, two variants of which will be described in reference to FIGS. 4A and 4B.

As shown in both of those figures and in FIG. 3, the hub structure 35 comprises a radially outer cylindrical sleeve 39, which is preferably press or force fitted within the opening of the intermediate annular plate 34, extending equal distances on either axial side of that member and having end-abutted engagement with the inner sides of the two end plate members 33, thus to prevent movement thereof toward one another.

The second component of the hub structure 35 is a radial inner sheet metal sleeve 40, which is snuggly telescoped axially within the bore of spacer sleeve 39 and is of an axial length and diameter to also extend with a reasonably close fit in the openings 36 of the outer annular plate members 33. The extreme ends of the inner sleeve 40 are flanged or flared 90° radially outwardly at 41 to engage against the outer sides of the plate members 33, being preferably received in shallow outside counter bores 42 of the plate opening 36.

Thus the hub structure 35 performs multiple functions including spacing the three plates 33, 34 axially, holding them tightly in assembly, mounting the wheel to its driver shaft, and strongly reinforcing the wheel as a whole. Its component sleeve members 39, 40, in common with other cylindrical axial spacer embodiments to be described, may be in the form of sheet or equivalent metal tube lengths, or they may be lengths of a suitable gauge non-metallic stock, such as Nylon. Their flanged and force-fitted mount to the plates 33, 34 is a significant factor contributing to the strength and rigidity of the wheel or tool 32, notwithstanding its light weight.

The bearing pins 44 of the embodiment of the invention shown in FIG. 4A are solid in their cylindrical cross-section, and are of a length to extend oppositely through the end plate members 33, to which they are rigidly joined, as by welding at 45. However, equivalent relatively permanent connections may be resorted to, such as riveting, force fitting, etc. This type of fixed connection supplements the action of the hub structure 35 in preventing any degree of axial movement of the annular plates 33, 34 relative to one another, but has the evident disadvantage of rendering more difficult a dismantling of the structure. Hence, if desired, a recessed mount of the flap bearing pins 44 to the plates 33, similar to that of the pins 18 in FIGS. 2A and 2B, may be adopted.

The sub-variant shown in FIG. 4A is specially designated 32' to distinguish it from the other quite similar sub-variant, specially designated 32'', which appears in FIG. 4B, corresponding reference numerals being employed in both instances to designate corresponding components and relationships.

As illustrated in FIG. 4B, the finishing flap journaling pins 46 are, in the interest of lightness of weight, in a form of elongated hollow tubular dowels of cylindrical cross-section. They extend through the annular plates or discs 33, 34; and may be held against movement relative to the latter, as by annular flanged retainers 47 of dished cross section encasing the opposite ends of the pins 46 and welded or otherwise fixed permanently or removably flush against the outer surfaces of the two end plates 33. Like the dowels or pins 44 of FIG. 4A the material of the pins 46 is subject to choice. The retainers 47 may be stamped or molded.

FIG. 5 illustrates a finishing flap 48 pursuant to this invention which has an improved arrangement to hinge it (and its mates) on the bearing pins of the wheel body proper, as represented by the several pins embodiments thus described and in others to be described. The hinge arrangement of FIG. 5, and variations thereof shown in FIGS. 6 and 7, are of course alternatives to the several finishing flap pivoting arrangements illustrated and described in my copending applications identified above.

Flap 48 comprises a number of inner fill plies or laminae 49 and outer plies 50 enveloping them, the whole being held tightly in a pack by staples or belt lacing 51 or equivalent means. The material and treatment of the plies are optional, as above described.

The outside flap plies 50 are connected by an integral connecting loop or bight portion 52 at the radially inner extremity of the flap pack of unit 48; and an elongated tubular adapter and stabilizer rod 54 is snugly encircled by the bight just radially inwardly of the inside flap plies 49. In a finishing flap unit 48 intended for use on any of the multiple plate-type skeletal wheel units herein described, a central rectangular recess or notch 55 will be provided through the fill bight portion 52, so as to straddle the intermediate annular plate 12 or 34, and individual tubular elements 54 will be employed on either side of the notch 55. They are, of course, optional as to their material, like the flap pivoting pins 18, 44 or 46.

The inner diameter of the tubular elements 54 is such as to receive the flap journaling or bearing pins 18, 44, 46 for a desired free pivotal action within the elements 54. It is to be seen that the latter substantially rigidify and stabilize the flap unit 48 at its pivotal base, also spreading the bight 52 for a smooth entry of the pin, designated 18 for simplicity in FIG. 5.

FIG. 6 represents a considerably simplified alternative adaptation of the improved finishing flap. In this form, generally designated 56, s separate adapter and stabilizer element is dispensed with, and the outer plies or laminae 57 of the flap, as appropriately treated in any desired way, form an integral bight or loop 58 of appropriate diameter to receive the bearing pin 18 radially inwardly of the inside plies 59. The latter may be taper-skived at their radially inner ends for compactness; and the ply assembly is held together by suitable staple or belt lacer means 60. This flap version 56 has the evident disadvantage of presenting a greater difficulty of inserting the pin 18, but has the equally apparent advantage of lesser production cost and smaller size and weight.

The modified form 62 of finishing flap assembly shown in FIG. 7 is, like the embodiments of FIGS. 5 and 6, provided with a radially inner loop 63 integral with its outer plies or laminae 64. A U-shaped, bight forming and flap or fill reinforcing insert 65, preferably of a thin gauge flexible sheet metal, is matingly sandwiched in the bight 63 between outer plies 64 and plural inner plies 66. Staple or belt lacer means 67 clamp the flap ply and insert components 64, 65 and 66 in a compact assembly. The reinforcing insert 65 spreads the flap loop 63 to readily receive the bearing pin 18, as does the tube 54 shown in FIG. 5, and at the same time affords a like stable pivotal bearing surface for the pin 18.

FIG. 8 and 9A illustrate another embodiment, generally designated by the reference numeral 68, of the multiple, spaced annular plate concept basic and common to all wheel forms herein shown and described. Like the wheels shown in FIGS. 3, 4A and 4B, the wheel 68 employs a composite cylindrical sleeve-type spacing structure, however, in this case such spacing structure operates in association with supplementary adapter disc means which connects it to the wheel drive.

Thus, the wheel assembly 68 of FIGS. 8 and 9A comprises a pair of identical, though oppositely oriented, annular adapter discs 69 of relatively large diameter and dished and flanged cross section having axially aligned openings 70 at which they are appropriately mounted fixedly to a drive shaft or spindle, not shown. Each disc 69 is offset 90° axially outwardly at 71 to form a continuous circumferential shoulder adjacent its periphery, and is then bear 90° radially outwardly to afford a continuous peripheral flange at 72. The shoulders are press fitted within the opposite axial ends of a cylindrical plate spacing and restraining assembly 74 generally similar in nature to the sleeve structures 35 of FIGS. 3, 4A and 4B which mount directly on a driveshaft.

Cylindrical assembly 74 comprises a cylindrical inner sleeve 75 of diameter substantially greater than the axial disc openings 70, and sufficiently great in axial length and inner diameter to nest within the adapter disc shoulders 71, preferably with the described press fit. A pair of like outer cylindrical sleeves 76 are press fitted on sleeve 75, being in end abutment with opposite sides of an intermediate annular plate member 78, for which they serve as locating spacers. The outer ends of sleeves 76 engage against the inner sides of outer annular plates 79 of wheel 68, thus holding those plates rigidly against axial inward movement; and the opposite axial ends of the inner tubular sleeve 75 assembly 74 are flanged or flared 90° radially outwardly about their periphery into gripping and restraining engagement with outer side surfaces of the annular plate members 79.

A choice of metallic or non-metallic sheet materials is available, as indicated above, for the adapter discs 69; and they are given their dished and flanged cross section and outline by any of the well-known stamping, die-forming, molding or like operations appropriate to the selected material. As for the spacer sleeve structure 74, options exist as to material and method of making; and these observations apply equally to embodiments of the invention to be described.

In accordance with FIGS. 8 and 9A, the finishing flap bearing pins or dowels 80 are in the form of elongated tubular rods extending through aligned openings in the plates 78 and 79; and they are spun, crimped or flared radially outwardly at 81 on opposite sides of plate members 79, thus completing a rigid gripping securement of the annular plates and cylindrical spacer assembly 74 to one another. The outer pin ends 81 are masked between flanges 72 of the end discs 69, which indicates that, if desired, these ends may be left plain and un-flared, since the flanges 72 will serve as end retainers for the pins 80.

A modified embodiment 82 of the wheel of FIG. 9A appears in FIG. 9B, 82 differing but slightly from the wheel 68; hence corresponding reference numerals are employed to designate corresponding parts, and further description of common components is unnecessary. In this form, in lieu of a heading over of the flap bearing pins, the pins 83 (tubular in nature like the pins have small rivets 84 press-fitted into the opposite ends of each pin bore. The heads of the rivets 84 overlap and bear against the outer sides of the two end plates 79 so as to lock the parts of the assembly 74 relative to one another.

In a typical finishing tool or wheel 68 or 82 pursuant to FIGS. 9A or 9B the annular bearing pin mounting discs will have an O.D. of 8 inches, and I.D. of 6 inches and there will be 40 of the pins 80 or 83 disposed in equal 9° spacing on a circular locus of 7 ¼ inch diameter. The diameter of the axial disc holes 70 will of course be determined by the diameter of the driver; a diameter of 2.130 inches would be typical.

FIGS. 10 and 11 illustrate a still further modified embodiment 84 of a basic annular plate and cylindrical spacer-type wheel. It is very similar to the embodiments of FIGS. 9A and 9B, in that it features a cylindrical axial spacer structure 85 composed of a radial inner sleeve 86 of cylindrical section surrounded in a force fit by radially outer spacer sleeves 87. These have end abutting engagement between outer annular pin-mounting plates 88 and an intermediate like plate 89 held equidistant therebetween by spacers 87. As in the embodiments of FIGS. 8, 9A and 9B, the ends of the inner sleeve 86 are flanged 90° radially outwardly about its periphery at 90 to grip and retain the end plates 88. However, in the form of FIGS. 10 and 11 the cylindrical spacer structure 85 serves, as in the form of FIG. 3 as an operating hub drivingly engaged directly with a powered rotary shaft or spindle (not shown), whereas in the FIG. 8 embodiment the shaft drive is applied to the end adapter discs 69.

End and intermediate annular plates 88, 89 of wheel 84 of FIGS. 10 and 11 (typically shaped and dimensioned as in embodiment 68) are provided with through holes receiving hollow elongated bearing pins 92 which have their flared ends 93 in engagement with the outer sides of plates 88. For the purpose of reducing weight, the plates 88, 89 are shown as being provided with a series of rather large circular openings 94, for instance of a diameter of 1 ½ inches, spaced equally at 45° intervals in an annular zone intermediate the cylindrical hub and spacer-retainer structure 85 and the base circle or locus of the flap bearing pins 92. The openings 94 are sufficiently spaced radially between these circular zones to afford ample material strength to withstand the operating stresses to which wheel 84 is subject.

It is seen from the foregoing that the invention affords multiple modifications, and sub-variants thereof, which are in common characterized by an axially spaced and aligned set of annular plates of a relative thin gauge stock of one sort or another, these are so spaced by cylindrical or plural rod means to offer a skeleton like head for a rotary tool on which multiple finishing flaps are pin-pivoted for a well balanced rotary finishing action on a workpiece. While in each instance the set of annular plates is shown as being three in number, thus affording a a stable, well-distributed and bend-proof radial support for the flap pivoting pins, it is obvious that the number of the plates may be two or more than three, depending on the requirement of the installation.

What is claimed is:

1. A rotary finishing tool comprising a rotatable tool body having a set of coaxial and axially spaced annular plates of relatively slight axial thickness, including axially outer plates and at least one intermediate plate axially spaced between said outer plates, at least some of said plates having means to mount the same to an axial driver, circumferentially spaced, axially extending pin means carried on said outer and intermediate plates adjacent the outer periphery thereof and mounting finishing units to extend radially outwardly of said tool body, said units having means at least partially surrounding and pivotally related to the respective circumferentially spaced pin means so as to be capable of individual swing about the latter as an axis, and means located radially inwardly of said pin means and in fixed axial engagement with the outer and intermediate plates to maintain said plates in said axial spacing thereof.

2. A rotary finishing tool comprising a rotatable tool body having a set of at least three axially outer and intermediate coaxial annular plates of relatively slight axial thickness spaced axially from one another a distance substantially greater than the individual thicknesses thereof, said plates having means to mount the same as a set to an axial driver, a plurality of elongated, circumferentially spaced and transversely extending elements carried by said plates adjacent but inwardly of the outer periphery thereof, said elements paralleling the rotative axis of the tool and mounting finishing units to extend radially outwardly of said tool body, said units having means at least partially surrounding and pivotally related to the respective circumferentially spaced mounting elements so as to be capable of individual swing about the latter as an axis, and means paralleling the tool axis radially inwardly of said mounting elements and in fixed axial engagement with the outer and intermediate plates to maintain said plates in said axial spacing thereof.

3. The tool of claim 1, in which said plate spacing maintaining means is located at a radial zone outward of said first named, plate mounting means.

4. The tool of claim 1, in which said plate spacing maintaining means comprises an annular series of rod-like elements connected to a least certain of said plates and paralleling the tool axis radially inwardly of said finishing unit-mounting means.

5. The tool of claim 2, in which said plate spacing maintaining means comprises an annular series of rod-like elements connected to a least certain of said plates and paralleling the tool axis radially inwardly of said finishing unit-mounting elements.

6. The tool of claim 2, in which said elongated mounting elements are pins of solid cross section having a readily releasable connection to at least one of said plates.

7. The tool of claim 2, in which said elongated mounting elements are pins of solid cross section having a relatively permanent connection to at least one of said plates.

8. The tool of claim 2, in which said elongated mounting elements are pins of hollow cross section having a readily releasable connection to at least one of said plates.

9. The tool of claim 2, in which said elongated mounting elements are pins of hollow cross section having a relatively permanent connection to at least one of said plates.

10. The tool of claim 4, in which said rod-like spacing elements are of solid cross section in abutting engagement at the ends thereof with certain of said plates to space the latter axially.

11. The tool of claim 5, in which said rod-like spacing elements are of hollow tubular cross section in abutting engagement at the ends thereof with certain of said plates to space the latter axially.

12. The tool of claim 4, in which said rod-like spacing elements are of solid cross section in abutting engagement at the ends thereof with certain of said plates to space the latter axially, and means for releasably securing said elements to said certain plates.

13. The tool of claim 5, in which said rod-like spacing elements are of hollow tubular cross section in abutting engagement at the ends thereof with certain of said plates to space the latter axially, and means including a stud-like part extending through each element for releasably securing said elements to said certain plates.

14. A rotary finishing tool as defined in claim 1, in which said finishing units comprise inner and outer plies secured in a laminated stack, certain of the outer plies being integrally connected by an axially extending loop portion at a radially inner end of the unit, which loop portion is radially inward of the inner ply structure and affords said means at least partially surrounding and pivotally related to said pin means of the tool, said loop portion radially inwardly straddling an intermediate plate of the plates of the tool and being constituted by a plurality of coaxial elements of length substantially equalling the axial spacing of said outer and intermediate plates from one another.

15. The rotary finishing tool of claim 14, in which said loop portion engages directly around said pin-like element.

16. The rotary finishing tool of claim 14, in which said loop portion has a tubular sleeve to telescopingly receive said pin-like element.

17. The rotary finishing tool of claim 14, in which said loop portion has a U-shaped reinforcing insert therein to receive said pin-like element.

* * * * *